March 13, 1934. A. A. ANGELL 1,950,379
METHOD OF MAKING A BRUSH
Original Filed Jan. 31, 1929 3 Sheets-Sheet 1
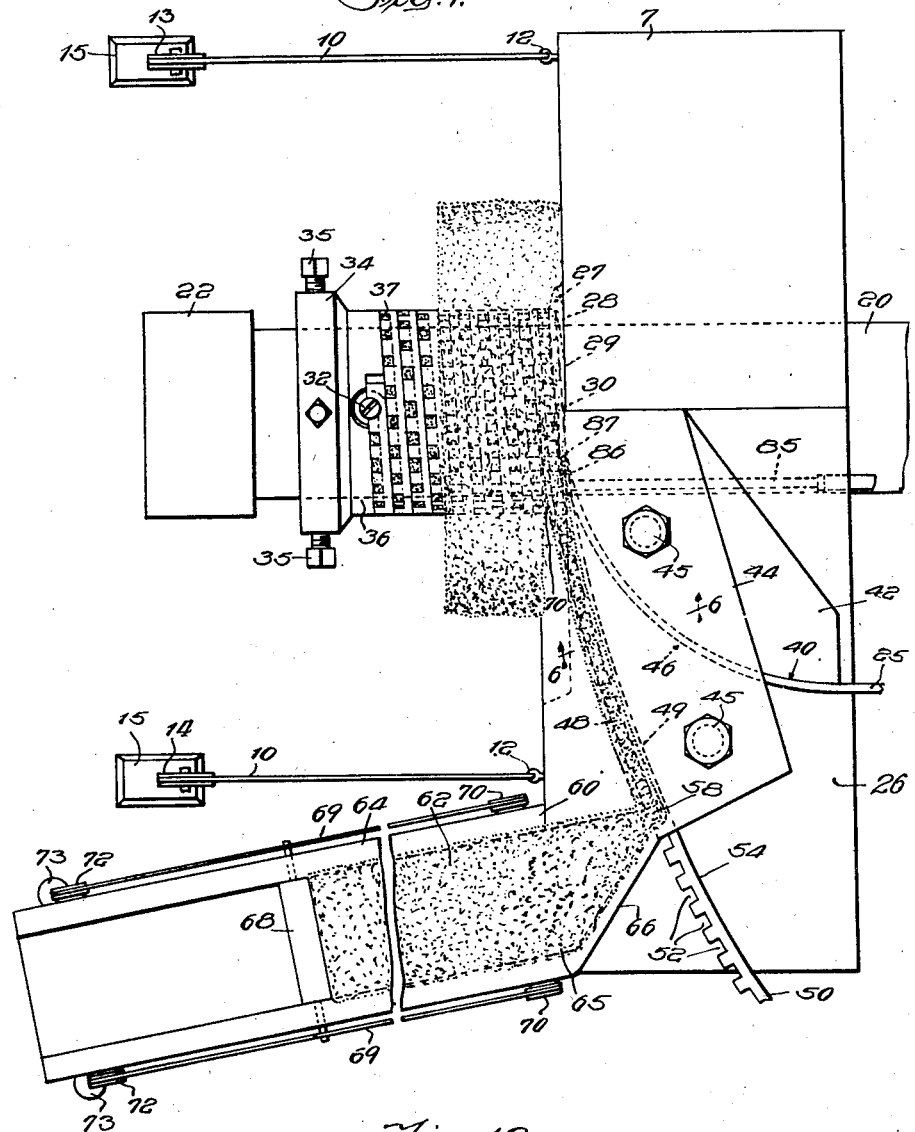
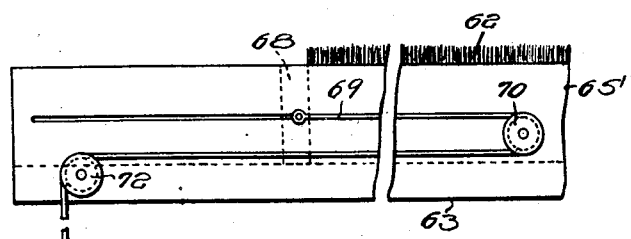

March 13, 1934. A. A. ANGELL 1,950,379

METHOD OF MAKING A BRUSH

Original Filed Jan. 31, 1929 3 Sheets-Sheet 2

Witness:
William P. Kilroy

Inventor:
Arnold A. Angell
Brown, Jackson, Boettcher & Dienner
By Attys

March 13, 1934.  A. A. ANGELL  1,950,379
METHOD OF MAKING A BRUSH
Original Filed Jan. 31, 1929   3 Sheets-Sheet 3
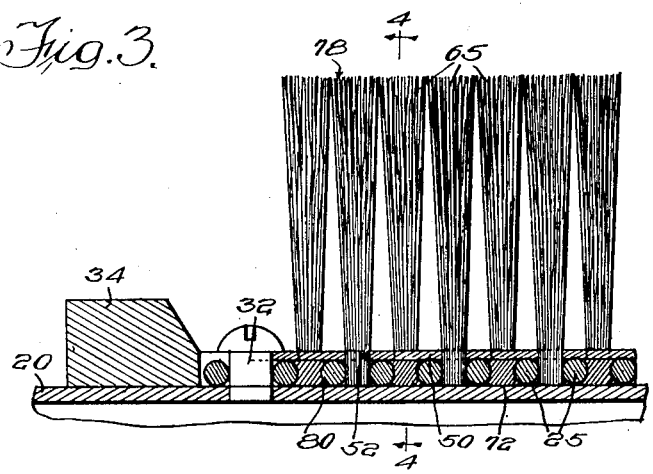
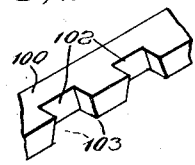
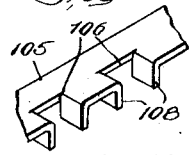
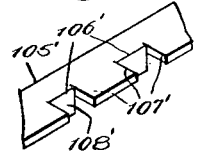
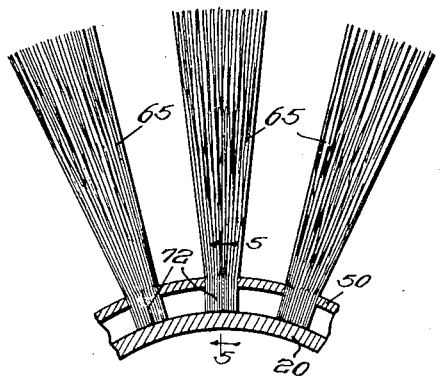
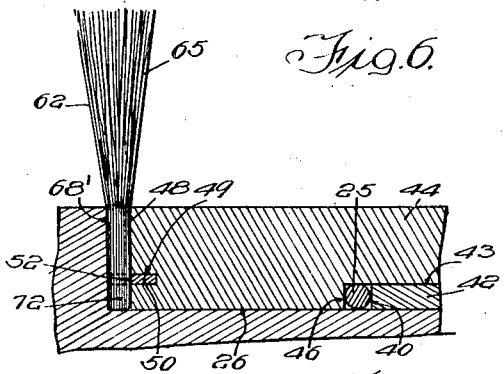
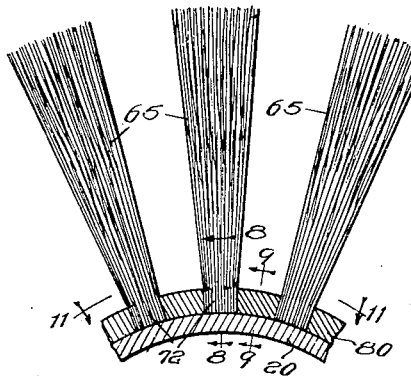
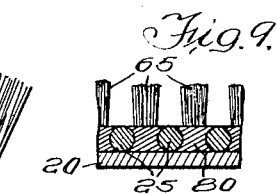
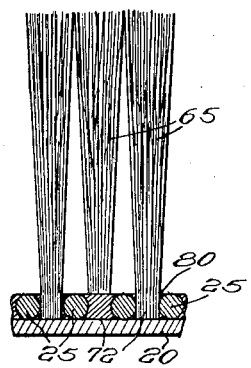
Witness:
William G. Kilroy
Inventor:
Arnold A. Angell
By Brown, Jackson, Boettcher & Dienner
Attys Patented Mar. 13, 1934

1,950,379

UNITED STATES PATENT OFFICE 1,950,379

METHOD OF MAKING A BRUSH

Arnold A. Angell, Chicago, Ill.

Application January 31, 1929, Serial No. 336,484
Renewed September 27, 1933

23 Claims. (Cl. 300—21)

My invention relates to improvements in brushes and to an improved method of and means for making brushes embodying the improvements.

The invention relates particularly to cylindrical brushes and is illustrated and described in connection with such a brush but it is to be understood that variations and different embodiments are contemplated within the spirit and scope of the appended claims.

Cylindrical brushes in which the bristles are arranged as a continuous helical fringe are known. Tufted brushes are also known. Where the bristles are arranged in tufts I find that they have the advantage of taking up by capillarity in the tufts a charge of the material to be applied. The tufts give the ability to pick up by capillary action relatively heavy filler or dressing materials, for example, and it is also easier to clean a tufted brush especially around the base on which the tufted bristles are arranged.

The tufts permit the use of softer bristles than where the bristles are arranged in a continuous fringe and they also permit the use of longer bristles. A tufted brush is also better aerated. The bristles will dry easier and quicker and a clean and better condition of the brush is assured at all times.

As heretofore constructed, however, tufted brushes have not been entirely satisfactory. The yieldability of the bristles has commonly varied through the different parts of the tuft. This is particularly noticeable in a round tuft, for example, where the center of the tuft is commonly less yieldable than the edges. This greater rigidity at the center or variable yieldability through the tuft tends to leave streaks in the work, applying the material too thickly along the edges or more yieldable portions of the tuft and too thinly along the center or rigid part of the tuft. As heretofore constructed, these tufted brushes have also been difficult and expensive to manufacture. The manner of tufting and attaching the tufted bristles has been difficult and expensive, commonly requiring separate intricate operations. The tuft binding and attaching provisions previously existing have tended to increase the irregularity in the yieldability of the bristles through the tufts and have offered crevices in which the paint or other material will collect and from which it is difficult if not impossible to remove this material. At the same time unless the bristles are firmly bound and attached, they will come out and not only further increase the irregularity of the brush but may adhere to the work or surface to which the material is applied, thereby blemishing or impairing the desired appearance.

According to my invention the bristles are arranged in tufts. The tufting and binding structure and method of making the brush are simplified and reduced in cost. The bristles are substantially uniform or at least of more uniform yieldability over the entire tuft without any center or portion of less yieldability or greater rigidity and without the streaking or uneven application of the material as heretofore. Crevices or interstices for the collection of the paint or other material are eliminated and the brush is especially adapted for ease of cleaning, particularly about the bases of the tufts of the bristles. At the same time, the tufts take up by capillarity a charge of the material to be applied and give the ability to pick up by capillary action heavy filler or dressing materials, for example. Ease and expediency of drying are obtained and softer and longer bristles may be employed.

The brush preferably comprises a core or base and a coil is wound helically upon this base. At the same time, a bristle tufting strip is laid and wound helically about the coil preferably with the winding of the coil, and this strip is provided with notches or sockets which are preferably uniform in dimensions and uniformly spaced. The sockets are shaped and proportioned to impart the desired contour and dimensions to the tufts of bristles and the bristles are fed into these sockets preferably as the tufting strip and coil are wound upon the base or core or delivered thereto.

The base or core ends of the tufts of the bristles not only fit in the sockets in the tufting strip but preferably extend inwardly between the convolutions of the coil and a permanent binder for the bristle tufts is preferably introduced in plastic or fluid condition and hardened around the base ends of the bristles within the helical space defined between the convolutions of the coil and between the tufting strip and base or core of the brush.

The binder is preferably introduced as the coil and tufting strand are wound upon the base and the introduction of the binder preferably follows or is with the introduction and tufting of the bristles. This binder binds the base ends of the bristle tufts firmly together. The material which I prefer to employ as the binder is a phenol condensation product in alcohol or other suitable solution. The shrinkage of this material from liquid to solid state is very slight and it is not hygroscopic and will not warp or be deteriorated by the material with which the brush is employed. It is to be understood, of course, that other binder materials may be employed within the scope of the present invention and that other solvents than alcohol or alcohol solutions may be employed for the binder.

Upon completion of the brush, the coiled tufting strip may be removed and the helical binding coil may be suitably secured or anchored particularly at its opposite ends to the base or core of the brush. By making this coil of circular section, such as provided by a relatively heavy gauge wire, it interlocks with the binder between the convolutions of the coil, providing not only a helical reinforcement to the base of the brush but securing the binder effectively to the brush core or base.

It is to be understood that, instead of employing a separate coil beneath the tufting strip, this tufting strip itself may be of suitable thickness or provided with down-turned portions or otherwise formed to provide for the desired anchoring of the base ends of the bristles or the coil itself may be provided directly with the bristle tufting pockets. It is to be still further understood that the binder means need not be continuous helically about the base of the brush, but may be in the form of separate or individual tuft binders at the base of each tuft. Also the tufting means need not be removed upon hardening of the binder, but may remain to form a permanent part of the brush and this is particularly so where the coil forming and tufting means constitute a single unitary element.

The features and advantages of the invention will be apparent from the following detailed description and accompanying illustration of a specific embodiment of the invention.

In the drawings:

Figure 1 is a fragmentary and more or less diagrammatic top plan view of a machine for making brushes embodying the present invention;

Figure 3 is a fragmentary section taken on the line 3—3 of Figure 2;

Figure 4 is a fragmentary section taken on the line 4—4 of Figure 3;

Figure 6 is a fragmentary detail section taken on the line 6—6 of Figure 1;

Figure 7 is a view similar to Figure 4, showing the molded base in place and the tufting strip removed;

Figure 8 is a fragmentary section taken on the line 8—8 of Figure 7;

Figure 9 is a fragmentary section taken on the line 9—9 of Figure 7;

Figure 10 is a fragmentary perspective view of the tufting strip;

Figure 13 is a more or less diagrammatic and fragmentary side elevational view of the bristle hopper, showing illustrative means for feeding the bristles to the strip which tufts the bristles and lays the tufts helically upon the core;

Figure 14 is a fragmentary perspective view, showing a single unitary coil and tufting element; and Figures 15 and 16 are views similar to Figure 14, showing further forms of single unitary coil and tufting elements.

Figure 2:
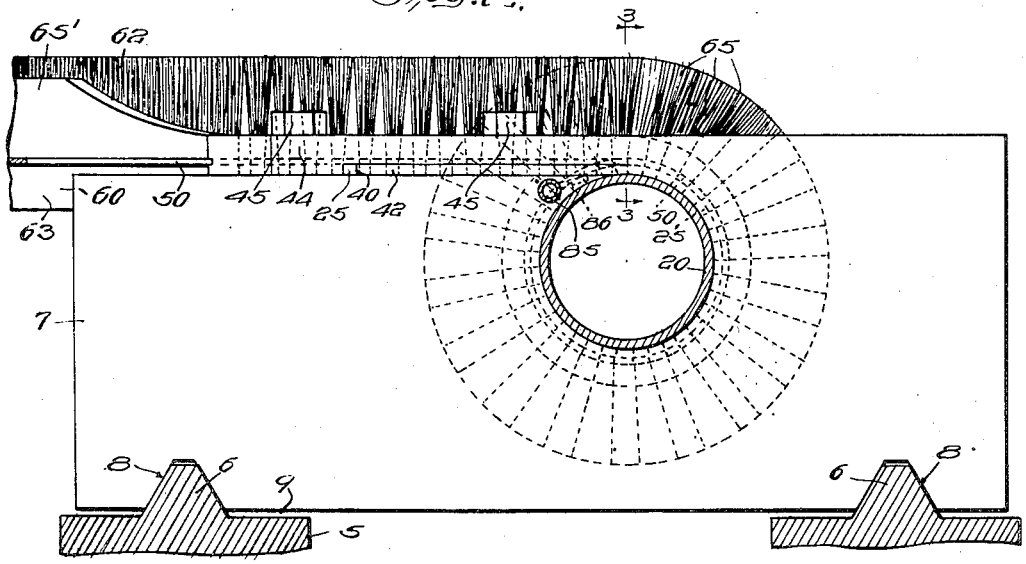
Figure 2 is a fragmentary end view partially in section.

Referring to the drawings, the bed of the machine, designated fragmentarily at 5 in Figure 2, has a pair of parallel tracks 6. Supported upon the bed 5 for sliding movement longitudinally thereof is a block or carriage 7 having ways 8 in which the tracks 6 engage and guide the block 7 in its sliding movement on the bed 5.

The tracks 6 and cooperating ways 8 may be tapered, the block 7 preferably bearing on the tapered sides of the tracks and there preferably being a slight clearance at 9 between the opposing horizontal surfaces of the bed 5 and block 7.

The block 7 is urged to the left in Figure 1, as by means of a pair of cables or other flexible elements 10 and 11 anchored or attached to the block 7 at 12. These cables 10 and 11 pass over pulleys or sheaves 13 and 14, respectively, and have at their opposite ends weights 15, which tension the cables 10 and 11 and tend to pull the block 7 to the left as viewed in Figure 1. This constant pull on the block 7 to the left subjects the brush, which is wound ahead of the block 7 to continuous pressure in the direction of its axis during formation. The foregoing details, which are more fully disclosed in my copending application, Serial No. 26,870, filed April 30, 1925, which application has matured since the filing of the present application into United States Letters Patent No. 1,721,062, issued July 16, 1929, may be varied widely within the scope of the present invention.

In the illustrated embodiment of the invention, the core of the brush comprises a suitable metallic tube 20. The tube 20 passes through, and is supported by, the block 7 and is free to rotate therein, the block 7 and parts carried thereby sliding longitudinally along the tube toward the right (Figure 1) as the brush is made up upon the tube. In addition to forming a support for the other parts, the block 7 thereby forms a support and guide for the free end of the core forming tube 20.

For the purpose of rotating the tube 20, suitable turning or rotating means is indicated at 22. This means may comprise a chuck provided with jaws in which the adjacent end of the tube 20 is clamped and the tube or rotating means 22 may be connected with or be a part of a suitable driving spindle. Suitable means for this purpose is shown in the above-referred-to application, and in that this means forms no part of the present invention, further disclosure thereof will be omitted here. Suffice it to say that the chuck or driving part 22 may be driven or rotated by a belt or any other suitable form of drive.

The strand 25, which forms the helical coil of the preferred form of the brush is preferably in the form of a wire of suitable gauge and suitable resiliency and strength and of circular section as shown, but it is to be understood that this strand may be of some other suitable material having the desired or equivalent properties. It may be iron wire.

From a spool or other suitable source of supply the coil forming strand 25 passes over the upper surface 26 of the block or table 7 and is guided helically onto the brush core 20 by a generally helical surface 27 at the forward end of the block 7.

The guide surface 27 constitutes the outer face of a hub-like portion 28 formed integral with the block 7 and the helical surface starts, for example, at the point 29 (Figure 1) and extends helically about the tube or brush core receiving bore of the block, terminating at a point 30. In winding the brush, the strip 50 is laid or wound with the opposite edges of the turns thereof in engagement and the pitch is thereby formed by the strip 50. Between the points 29 and 30, the slope or pitch of the helical surface 27 preferably corresponds to the pitch of the coil which is formed by the strip 50 and preferably has a uniform helical advancement, although the pitch may be increased slightly at the point of entrance of the coil strand with the tufting strand and bristles to form a throat for the easy admission of the bristles and other elements onto the core.

The free end of the strand 25 may be anchored or secured to the tubular core 20, as by means of a screw 32, and fixed upon the core 20 adjacent the inner or first convolution of the brush is a collar 34. This collar 34 may be fixed upon the core 20, as by means of set screws 35, and the collar is provided with a hub-like portion 36, having a helical end surface 37 corresponding with the pitch of the winding of the brush and cooperating endwise with the first convolution of the brush.

As the first convolution of the brush is wound or laid upon the core it is preferably pressed endwise against the surface 37 by the pull on the cables or flexible elements 10 and 11 which urges the block 7 to the left (Fig. 1). In this manner the coil as well as the tufting strand and bristles may be subjected to continuous pressure in the direction of the axis of the brush during formation but this may be varied so far as the present invention is concerned.

The strand 25 is guided over the block 7 around the curved or rounded edge 40 of a plate 42 which is mounted upon the block 7 and fits between the upper surface 26 thereof and the upwardly offset and downwardly facing surface 43 of a block 44 which is clamped or secured upon the block 7 as by means of bolts 45 one of which is shown as passing through the underlying plate 42. Following and conforming in curvature with the edge 40 of the block 42 the block 44 has a curved edge 46 between which and the edge 40 the strand 25 is confined in its passage over the block 7 to the core 20.

The edge of the block 44 to the left as viewed in Fig. 1 is curved at 48 and this curved edge 48 is provided with a correspondingly curved groove 49 through which the strand 50 passes and is guided to the core 20. The strand 50 is preferably in the form of a flat metallic strip of suitable resiliency and strength, and this strip constitutes the tuft forming strip for the brush. A copper strip has been used with good results for this purpose, and copper as well as galvanized coil forming strands 25 have also been used with good results.

The strip 50 has notches 52 spaced uniformly and opening laterally from the edge of the strip 50 presented toward the left as viewed in Fig. 1. The notches 52 which are preferably uniform in contour and dimensions are preferably of generally rectangular configuration. This rectangular configuration of the notches 52 forms the bristles in generally rectangular tufts, and I find that this is highly desirable in that it presents in each tuft a uniform yieldability over the entire tuft in the direction of application of the material by the brush. As already pointed out, with a round tuft there is less yieldability at the center than at the edges and tufts of this sort tend to leave streaks in the work which is avoided with the present tuft formation. In addition by tufting the bristles between the turns of the coil these tufts take up by capillarity a charge of the material to be applied and give the ability to pick up the filler and dressing materials by capillary action in a manner not obtained with a brush in which the bristles are arranged in a continuous fringe.

Figure 5:
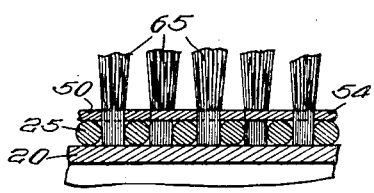
Figure 5 is a fragmentary section taken on the line 5—5 of Figure 4, with the binder or molded base applied.
Figure 12:
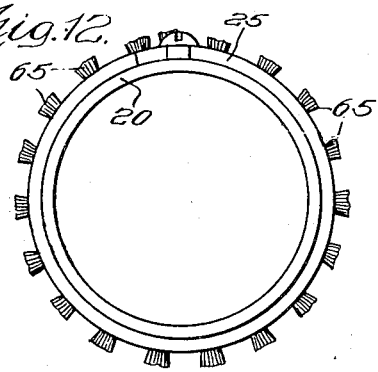
Figure 12 is an end view of the brush section shown in Figure 11.

The tufting strip 50 is guided helically upon the core 20 with the coil strand 25 by the helical surface 27 and is wound helically upon the coil 25. The end of the strip 50 may be anchored upon the core 20 with the coil strip 25 by means of the post or screw 32 as shown. The continuous portion edge 54 of the strip 50 is shown in Figs. 3 and 5 as being of a width substantially equal to the diameter of the coil strand 25 and the widths of the notches 52 transversely of the strip 50 are shown as being substantially equal to the longitudinal spacing or distances between the convolutions of the coil 25.

This width or dimension of the notches 52 may be proportioned to dispose the long dimensions of the notches and thereby the long dimensions of the flat or generally rectangular tufts parallel with the axis of the brush or as in the embodiment shown in which the notches 52 and thereby the tufts are of generally square configuration or with the circumferential dimension slightly longer than the axial or longitudinal dimension.

In its passage to the core 20 the tufting strand 50 passes across the outlet 58 of the bristle hopper 60 with the open sides of the notches 52 presented thereto. The bristle hopper 60 is preferably carried by the block 7 and the bristles 62 are disposed upright and preferably with their butt ends downwardly upon the base 63 of the hopper 60 between the side walls 64 and 65' thereof. The side wall 65' is shown as being inclined at 66 to taper the hopper toward the relatively restricted outlet 58 which is preferably of a width substantially corresponding with the dimensions of the individual slots 52 longitudinally of the strip 50.

For the purpose of pressing the bristles toward the outlet 58 and into the notches 52 as the tufting strip 50 passes the outlet 58 the bristle hopper has suitable means shown in the form of a follower 68 which is urged to the right (Fig. 1) with the bristles ahead of it by suitable cables or other flexible elements 69 attached to the follower 68 and trained over sheaves or pulleys 70 and 72 and tensioned by weights 73.

This means keeps the bristles properly compacted at all times and forces same through the outlet 58 and into the notches 52 as the strip 50 passes the outlet 58.

The bristles are generally supplied to the brush manufacturer tied up in bundles with the butt ends all one way and with the string or other binding means wrapped close to the butt ends. To supply the bristle hopper with bristles such a bundle may be placed upon the bottom 63 and within the hopper ahead of the follower 68 and the binding means may then be removed. Then as the tufting strip 50 passes across the outlet 58 of the hopper the notches 52 are successively filled with bristles which are thus arranged in generally rectangular or flat tufts by the strip 50 and then as the strip advances it carries these tufts designated at 65 with it over the block 7 and to the core 20. The butt or base ends of the bristle tufts 65 may travel over the surface 26 of the block 7 as shown in Figure 6, and this block 7 may be offset upwardly to provide a vertical shoulder 68 between which and the edge 48 of the block 44 the bristle tufts 65 pass to the core 20. The upstanding or upwardly offset portion of the block which bears the surfaces 68 is tapered toward the core 20 and is shown in Figure 1 as terminating at 70. The surface 68′ follows and conforms with the edge 48 in spaced relation thereto. As the tufts of bristles leave the upright surface 68′ they are engaged either with the preceding convolution of the brush or with the collar 36 and are thus held firmly in the notches 52.

Referring to Figure 6, it will be seen that the slot 49 is spaced above the surface 26 and that the base ends 72 of the bristle tufts project downwardly beneath the tufting strip 50. As the strip 50 is wound upon or around the coil 25, the downwardly projecting base ends of the tufts 65 are laid or disposed between the turns of the coil 25 and bound firmly therebetween as, for example, by the endwise pressure already referred to.

Figure 11:
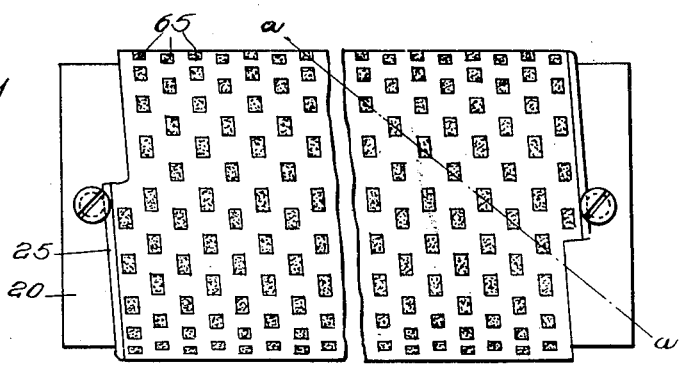
Figure 11 is a plan view of a brush section embodying the invention with the bristles in section on the line 11—11 of Figure 7.

The tufts 65 are preferably staggered uniformly, as they are laid helically upon the core 20. This disposes the tufts in the diagonal or helical convolutions and it is to be understood that the tufts may overlap uniformly if desired. The upper or outer ends of the bristles of each tuft will spread or flare outwardly as shown in Figures 3 and 4, providing, in effect, a substantially continuous outer brush surface 78. The outer flared ends of the bristles form a substantially continuous spiral effect, providing a continuous wiping cooperation with the work, which is highly desirable. A smooth and uniform spreading of the material over the work is obtained without some tufts leaving the work before others take hold. The spiral effect may be relatively long, as indicated by the dot and dash line a—a in Figure 11, or otherwise, as desired. For the purpose of securely binding the bases of the bristle tufts together and between the turns of the coil 25, a suitable binding base 80 is preferably provided. This base 80 preferably comprises a phenol condensation product, which I find is particularly suited for this purpose.

The shrinkage of this material from liquid to solid form is very slight and it is not hygroscopic and will not warp or be deteriorated by the materials with which the brush is employed. This binder is preferably introduced in solution brought to the desired consistency through a tube or conduit 85, which is provided with a nozzle 86 directed inwardly and generally tangentially with respect to the core 20 and provided with an outlet 87 for delivering the binder or base material 80 into the helical space defined between the turns of the coil 25 and between the outer periphery of the core 20 and the tufting strip 50. The phenol condensation product may be mixed in solution with an alcohol solution or any other suitable liquid or combination of liquids in the proportions which will provide the desired consistency or the desired plastic or fluid condition of the material, so that it may be discharged from the nozzle outlet 7 between the turns of the coil 25 preferably simultaneously with the initial formation of the brush and this introduction preferably continues as the brush is wound to provide a continuous helical binder between the turns of the coil from one end of the brush to the other. As the binder or base material 80 is introduced between the turns of the coil, the base ends of the bristles are imbedded therein and firmly bound together and between the turns of the coil. The binder or base supply may be delivered from the outlet 87 by pump or other suitable pressure means which may be operated, for example, by the winding machine itself, or by any other suitable means. A constant pressure may be maintained in the binder or base supply system by any suitable means.

Upon completion of the winding of the brush, the coil strand 25 and strip 50 may be severed and secured to the core 20 in the manner of the attachment of the opposite end at 32. The binder or base 80 may then be baked, air dried, or otherwise suitably hardened into place between the turns of the coil 25. Where this base is baked in place, the entire brush, including the core 20, as well as the bristle tufts, coil 25 and tufting strip 50, may be introduced into a suitable oven or otherwise subjected to the desired baking heat.

In baking this base in place, I find that, by starting and taking from four to eight hours to get up to 165 degrees F. removes the alcohol from the base. In one specific manner of practicing the invention, I have then increased the temperature to about 205 degrees F. for a couple of hours, and the water is removed by this time. I have then gone up to about 275 degrees F. and finished in about two hours or up to about 240 degrees F. and finished in about ten hours, with excellent results. These temperatures and periods are merely illustrative, and it is to be understood that the particular temperatures and periods of application of these temperatures may be varied. As already pointed out, the resulting base is especially suited for this purpose. The shrinkage from liquid to solid state is very slight, in the neighborhood of 4%. The base is thus hardened or molded between the turns of the coil, with the base ends of the bristles imbedded, impregnated and firmly secured therein and by the cylindrical section of the turns of the coil, the base is firmly interlocked with these turns and held firmly and securely therebetween.

After the brush is thus completed, the tufting and molding strip 50 may be unwound or removed from the brush and the brush may be made up in any desired length. The brush may be wound to the desired length or to relatively great length which may be divided into the desired lengths later.

The operation may be summarized briefly, as follows:

With the machine at rest, the tube 20 which is to form the core of the brush is secured in the chuck 22 and the collar 34 is secured upon the tube adjacent the chuck 22. Extending the tube 20 through the opening in the block 7, the block and entire carriage is moved longitudinally along the tube on the bed 5 of the machine to close proximity to the collar 34. The strand 25, which is to form the coil of the brush with the strip 50 superposed thereon is then led in from the reels or other sources of supply and through the paths previously pointed out around the helical surface 27 and secured to the core 20, as already explained.

The bristle hopper 60 and source of the binder or base material 80 having been properly supplied and the driving connections properly set to provide the desired feed, the turning or rotating mechanism for the core 20 is started. The rotation of this core 20 draws the strand 25 and superposed strip 50 onto the core 20, wrapping the strand 25 helically about the core 20 and the strip 50 helically about the strand 25. At the same time, and with the supply of the strand 50 to the core, the bristles are tufted into the notches 52 and the bristle tufts are laid helically between the turns of the coil. Also, at the same time, the binder or base material may be introduced through the outlet 87 in fluid or liquid condition between the turns of the coil and between the core and the strip 50 and this process continues until the brush reaches the desired length.

Where the block 7 is forced to the left (Figure 1) as explained, a constant longitudinal or axial pressure may be exerted or imposed upon the turns of the brush and after the desired length is reached, the brush may be removed from the winding machine and the base or binder 80 baked or hardened in place or allowed to air dry.

It is to be understood that the strand 50 takes the thrust of the block 7 and that this strand 50 forms the pitch of the brush turns. The brush may, of course, be made to the desired length initially, or it may be made in a relatively greater length and divided into the desired length.

In Figure 14, I have shown the single unitary coil and tufting element or strand 100 having the bristle tufting pockets 102, the sides 103 of which preferably flare downwardly, as shown. It is to be understood that this strand 100 is wound directly upon the core 20, for example, without any coil 25 thereunder. The strand 100 takes the thrust of the block 7 and forms the pitch of the brush turns, but instead of being continuous helically about the core of the brush, the binder means in this case is in the form of separate or individual tuft binders separately filling the tufting pockets 102. I find that the capillary action of the phenol condensation product binder upon the base ends of the bristles causes these ends to flare out into the downwardly spreading portions 103 of the pockets 102, which, when the binder hardens, firmly binds or secures the base ends of the bristle tufts in place. Due to this action, I find that it is not necessary to completely fill the tufting pocket, it being sufficient to introduce only enough binder or phenol to impregnate the base ends of the bristles, which swell out and secure the tufts in place.

The same is true of the preceding and following embodiments of the invention.

In Figure 15, the unitary coil and tufting strip is in the form of a flat sheet metal strip 105 having the tufting pockets 106, as before. The sides may be square at 107 and turned down at 108. I find that, in this form, when the binding material is introduced, to thoroughly impregnate the base ends of the bristle tufts, these base ends of the bristles will soak up the base or binder into the binding pockets, leaving the spaces 109 and any other spaces beneath the strip 105 clean. This may, of course, vary however. The openings which lead out from the pockets 106 to the spaces beneath the main body of the strip may provide sufficient retention for the binder so that the dove-tail formation may be omitted.

In the modification of Figure 16, the single unitary coil and tufting strip indicated at 105' that corresponds with strip 105 of the previous embodiment, except that the sides are shown square, as shown at 107', with the downturned portions 108' at the ends of the pockets 106', instead of at the sides thereof, as before. The strips 100—105 and 105' may be of iron.

Instead of the phenol condensation product binder, already described, I contemplate using a rubber cement binder. Instead of cementing the bristles to the core or backing member through the intermediacy of a strip or plurality of strips, I also contemplate cementing the bristles directly upon the core or backing without any such strips. This may be done, for example, in the modification of Figure 15, by using a suitable rubber cement and treating the edges of the bristle pockets 106 with paraffin, oil or the like, at the same time, keeping the surface of the core or backing member clean and bright.

I find that, by doing this, the cement will vulcanize directly to the clean surface of the core or backing member and that, due to the yielding character of the rubber cement and the treatment of the edges of the pockets 106, the entire strip 105 may be removed, leaving the binder means cemented directly to the surface of the core or backing member.

It will be noted that the tufts comprise parallel full length bristles and that the bristles are applied endwise to the surface of the core or backing member. It will be understood that certain aspects of the invention may be employed for making single brushes, that is, brushes comprising a single ring of bristle tufts and, in furtherance of this, the brush may be made up of a plurality of assembled rings of this sort. Also, the core may be roughened or recessed.

I do not intend, of course, to be limited to the precise details and steps shown or described.

I claim:

1. The method of making a brush which comprises winding a strand helically about a brush core, forming separate tufts of bristles along said strand in its movement to said core and laying said tufts helically with the winding of said strand.

2. The method of making a brush which comprises winding a strand helically about a brush core, introducing separate bristle tufts between the turns of said strand and impregnating the base ends of said bristles with a binder.

3. The method of making a brush which comprises winding a helical coil, forming separate tufts of bristles, introducing said tufts in spaced relation between the turns of the coil and introducing a binder between the turns of the coil and impregnating the base ends of the tufts of bristles therewith.

4. A step in the method of making a brush which comprises winding a helical coil, winding a bristle tufting strand upon said coil, supplying bristles to said strand and tufting the bristles between the turns of said coil by means of said strand.

5. A step in the method of making a brush which comprises winding a helical coil, winding a bristle tufting strand upon said coil, supplying bristles to said strand, tufting the bristles between the turns of said coil by means of said strand, and introducing a binder between the turns of the coil and impregnating the base ends of the tufted bristles therewith.

6. The method of making a brush which comprises winding a helical coil upon a core, winding a bristle tufting strand upon said coil, supplying bristles to said strand, tufting the bristles between the turns of the coil by means of said strand, and introducing a binder between the turns of the coil and between the tufting strand and said core and impregnating the base ends of the tufted bristles therewith.

7. The method of making a brush which comprises winding a helical coil upon a core, winding a bristle tufting strand upon said coil, supplying bristles to said strand, tufting the bristles between the turns of the coil by means of said strand, introducing a binder between the turns of the coil and between the tufting strand and said core and impregnating the base ends of the tufted bristles therewith and thereafter removing said tufting strand.

8. The method of making a brush which comprises rotating a brush core, delivering a tufting strand to said core, tufting bristles in said strand in its delivery to said core, winding the strand upon said core with a space between it and the core and introducing a binder in the space between the core and said strand with the core ends of the tufted bristles impregnated therewith.

9. The method of making a brush which comprises rotating a brush core, delivering a tufting strand to said core, tufting bristles in said strand in its delivery to said core, winding the strand upon said core with a space between it and the core, introducing a binder in the space between the core and said strand and impregnating the core ends of the tufted bristles imbedded therein, and thereafter removing said strand.

10. The method of making a brush which comprises rotating a brush core, delivering a strand having laterally opening spaced notches to said core, introducing tufts of bristles into said laterally opening spaced notches in the delivery of the strand to the core, winding the strand with the bristles tufted therein helically upon the core and closing said laterally opening notches by adjacent turns of the strand.

11. The method of making a brush which comprises rotating a brush core, winding a coil helically upon said core, delivering a strand having laterally opening spaced notches to said core, introducing tufts of bristles into said laterally opening spaced notches in the delivery of the strand to the core and winding the strand with the bristles tufted therein helically upon the turns of said coil.

12. The method of making a brush which comprises rotating a brush core, winding a coil helically upon said core, delivering a strand having laterally opening spaced notches to said core, introducing tufts of bristles into said laterally opening spaced notches in the delivery of the strand to the core, winding the strand with the bristles tufted therein helically upon the turns of said coil, and introducing a binder between the turns of the coil and impregnating the core ends of the bristles therewith.

13. The method of making a brush which comprises rotating a brush core, winding a bristle supporting and securing coil helically upon said core, separating the bristles into tufts, feeding the tufts of bristles between the turns of the coil as it is formed and applying pressure to said coil longitudinally of the brush during the winding of the coil.

14. The method of making a brush which comprises rotating a brush core, winding a bristle supporting and securing coil helically upon said core, separating the bristles into tufts, feeding the tufts of bristles between the turns of the coil as it is formed, applying pressure to said coil longitudinally of the brush during the winding of the coil, applying cementitious material to the ends of the tufts of bristles and to the surface of the backing member and hardening said material.

15. A step in the method of forming a brush which comprises winding a strand into a helical coil and tufting bristles in helically separated tufts between the turns of the coil simultaneously with the winding of the coil.

16. The method of forming a brush which comprises winding a strand into a helical coil in a continuous process, tufting bristles in helically separated tufts between the turns of the coil simultaneously with the winding of the coil and securing the bristles between the turns of the coil.

17. A step in the method of forming a brush which comprises winding a strand helically upon a core and tufting bristles in helically separated tufts between the turns of the strand simultaneously with the winding of the strand and with the bristles applied endwise to the surface of the core.

18. The method of forming a brush which comprises winding a strand helically upon a core, tufting bristles in helically separated tufts between the turns of the strand simultaneously with the winding of the strand and with the bristles applied endwise to the surface of the core, and securing the bristles between the turns of the strand and upon the core.

19. A step in the method of forming a brush which comprises winding a strand helically upon a core and tufting bristles in helically separated tufts between the turns of the strand simultaneously with the winding of the strand and in a path generally tangentially with respect to the core.

20. The method of making a brush which comprises winding a coil helically upon a brush core, tufting bristles between the turns of the coil, and securing the base ends of the tufts to said core.

21. A step in the method of forming a brush which comprises urging brush bristles through an opening, passing a serrated member before said opening to receive the bristles in its serrations, and winding said member helically with the bristles in serrations of said member.

22. The method of making a brush which comprises applying tufts of bristles helically to a backing member and securing the base ends of the bristles to said backing member.

23. The method of making a brush which comprises rotating a brush core, delivering a strand having laterally opening spaced notches to said core, introducing tufts of bristles into said laterally opening spaced notches in the delivery of the strand to the core, winding the strand with the bristles tufted therein in helical relation surrounding the core, and closing the laterally opening notches in the strand.

ARNOLD A. ANGELL.